(12) United States Patent
Lv et al.

(10) Patent No.: US 11,854,283 B2
(45) Date of Patent: Dec. 26, 2023

(54) METHOD AND APPARATUS FOR VISUAL QUESTION ANSWERING, COMPUTER DEVICE AND MEDIUM

(71) Applicant: Beijing Baidu Netcom Science Technology Co., Ltd., Beijing (CN)

(72) Inventors: Pengyuan Lv, Beijing (CN); Xiaoqiang Zhang, Beijing (CN); Shanshan Liu, Beijing (CN); Chengquan Zhang, Beijing (CN); Qiming Peng, Beijing (CN); Sijin Wu, Beijing (CN); Hua Lu, Beijing (CN); Yongfeng Chen, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 469 days.

(21) Appl. No.: 17/169,112

(22) Filed: Feb. 5, 2021

(65) Prior Publication Data
US 2021/0406619 A1   Dec. 30, 2021

(30) Foreign Application Priority Data
Jun. 30, 2020   (CN) .......................... 202010616417.6

(51) Int. Cl.
*G06V 30/262*   (2022.01)
*G06T 7/70*   (2017.01)
(Continued)

(52) U.S. Cl.
CPC ........ *G06V 30/274* (2022.01); *G06F 16/3344* (2019.01); *G06T 7/70* (2017.01);
(Continued)

(58) Field of Classification Search
None
See application file for complete search history.

(56) References Cited

FOREIGN PATENT DOCUMENTS

| CN | 110796031 A | * | 2/2020 | ......... G06K 9/00449 |
| JP | 2018036794 | | 3/2018 | |

(Continued)

OTHER PUBLICATIONS

Liang et al., "Focal Visual-Text Attention for Memex Question Answering," 2019, IEEE Transactions on Pattern Analysis and Machine Intelligence, vol. 41, No. 8, pp. 1893-1908 (Year: 2019).*

(Continued)

*Primary Examiner* — Vincent Rudolph
*Assistant Examiner* — Nicholas Crespo Stazer
(74) *Attorney, Agent, or Firm* — Hamre, Schumann, Mueller & Larson, P.C.

(57) ABSTRACT

The present disclosure provides a method for visual question answering, which relates to fields of computer vision and natural language processing. The method includes: acquiring an input image and an input question; detecting visual information and position information of each of at least one text region in the input image; determining semantic information and attribute information of each of the at least one text region based on the visual information and the position information; determining a global feature of the input image based on the visual information, the position information, the semantic information, and the attribute information; determining a question feature based on the input question; and generating a predicted answer for the input image and the input question based on the global feature and the question feature. The present disclosure further provides a device for visual question answering, a computer device and a medium.

13 Claims, 9 Drawing Sheets

Figure 1:
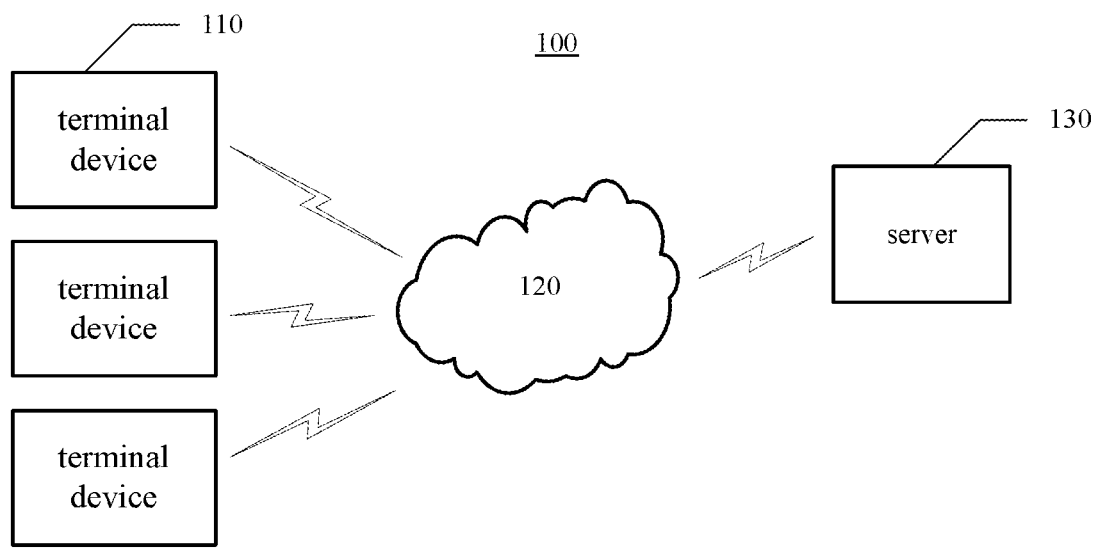

(51) Int. Cl.
*G06V 30/413* (2022.01)
*G06V 20/62* (2022.01)
*G06F 16/33* (2019.01)
*G06V 30/19* (2022.01)
*G06V 10/82* (2022.01)
*G06V 30/416* (2022.01)

(52) U.S. Cl.
CPC .............. *G06V 10/82* (2022.01); *G06V 20/62* (2022.01); *G06V 30/19173* (2022.01); *G06V 30/413* (2022.01); *G06V 30/416* (2022.01); *G06T 2207/30176* (2013.01)

(56) References Cited

FOREIGN PATENT DOCUMENTS

| JP | 2018036794 A | * | 3/2018 |
|---|---|---|---|
| JP | 2018085093 | | 5/2018 |
| JP | 2018180986 | | 11/2018 |

OTHER PUBLICATIONS

Hu et al., "Iterative Answer Prediction With Pointer-Augmented Multimodal Transformers for TextVQA," 2020 IEEE/CVF Conference on Computer Vision and Pattern Recognition (CVPR), pp. 9989-9999 (Year: 2020).*

Extended European Search Report, issued in the corresponding European patent application No. 21155165.0, dated Jul. 30, 2021, 7 pages.

Mishra et al., "OCR-VQA: Visual Question Answering by Reading Text in Images", International Conference on Document Analysis and Recognition (ICDAR), 2019, pp. 947-952.

Mishra et al., "OCR-VQA: Visual Question Answering by Reading Text in Images", 2019, 6 pages, cited in corresponding Japanese Patent Application No. JP2021-035338.

* cited by examiner

301

July 31, 2003

Consumer Relations Efficiency Team

Team: Nancy Bowland    Sharonda McMurray    Veronica Walton
      Gary Hicks       Nancy Montgomery     Yvette Willard
      Todd Holbrook    Brice O'Brien
      Cindi Hunter     Deena Walkup Objective: Balance cost efficiency with quality customer service Our Process:
* Examined Consumer Relations cost structure:
  - West Interactive – Automation        - AT&T
  - Bellamy – Live Rep                    - Brand Chargebacks
  - YA – Live Rep                         - Vertis
  - Ghostwriters

302

| Reasons for Consumer Contact: | % |
|---|---|
| Request Catalog/Order Form | 55% |
| Order Status | 10% |
| Mailing List Request (add, change, update add, target change) | 14% |
| Promotional Questions (lists, sends-notes questions, terms, Web issues, etc.) | 5% |
| Product Issues | 8% |
| Non-receipt EM, conversion, fulfillment | 5% |
| ELP Issues – card request, statement issues | 1% |
| Other | 1% |

* Conducted a zero-based planning exercise – *Hierarchy of Importance for Live Rep Support*

Pyramid (Non-Critical at top → Critical at bottom), *Live Rep access*:
- Retailer calls/other issues
- Catalog/order form requests
- Promotional program issues (order status, complaints)
- Brand product/packaging changes
- Mailing list additions/Database updates
- Product Quality/Liability Issues

* Examined 4 levels of service options ranging from $1.1MM to $6.1MM.

Fig.3B

METHOD AND APPARATUS FOR VISUAL QUESTION ANSWERING, COMPUTER DEVICE AND MEDIUM

CROSS-REFERENCE TO RELATED APPLICATION(S)

This application claims priority to the Chinese Patent Application No. 202010616417.6, filed on Jun. 30, 2020, which is incorporated herein by reference in its entirety.

TECHNICAL FIELD

The present disclosure relates to a field of computer vision and natural language processing, and more specifically, to a method and an apparatus for visual question answering, a computer device and a medium.

BACKGROUND

Visual question answering (VQA) is a challenging task, and a goal of visual question answering is to connect computer vision with natural language processing. In a visual question answering task, for example, given an image and a question related to the image, a machine is required to infer an answer for the question according to image content and some common sense. In order to complete the visual question answering task, the machine is ensured to have an ability of cross-modal understanding, to realize a comprehensive understanding of data under two different modalities of vision and language. Therefore, the visual question answering task has more requirements compared with other single modality tasks (such as image identification, document classification, etc.).

SUMMARY

In view of this, the present disclosure provides a method and an apparatus for visual question answering, a computer device and a medium.

One aspect of the present disclosure provides a method for visual question answering, comprising: acquiring an input image and an input question; detecting visual information and position information of each of at least one text region in the input image; determining semantic information and attribute information of each of the at least one text region based on the visual information and the position information; determining a global feature of the input image based on the visual information, the position information, the semantic information, and the attribute information; determining a question feature based on the input question; and generating a predicted answer for the input image and the input question based on the global feature and the question feature.

According to an embodiment of the present disclosure, the detecting visual information and position information of each of at least one text region in the input image comprises: detecting the input image by using a text detection model to generate a bounding box for each of the at least one text region in the input image. Wherein, image information in the bounding box for each of the at least one text region is for indicating the visual information of each text region, and position information of the bounding box for each text region is for indicating the position information of each text region.

According to an embodiment of the present disclosure, the determining semantic information and attribute information of each of the at least one text region based on the visual information and the position information comprises: for each of the at least one text region, recognizing the visual information of each text region by using a text recognition model to obtain the semantic information of each text region.

According to an embodiment of the present disclosure, the attribute information comprises: table attribute information. The determining semantic information and attribute information of each of the at least one text region based on the visual information and the position information further comprises: detecting position information of at least one table region in the input image by using a table detection tool; and determining the table attribute information of each text region based on the position information of each text region and the position information of the at least one table region, wherein the table attribute information is for indicating whether each text region is located in the at least one table region or not.

According to an embodiment of the present disclosure, the determining the table attribute information of each text region based on the position information of each text region and the position information of the at least one table region comprises: calculating an intersection between each text region and each table region and a union between each text region and each table region according to the position information of each text region and the position information of each of the at least one table region; calculating a ratio between the intersection and the union; determining table attribute information of each text region with respect to each table region as 1, in response to the ratio being greater than a predetermined threshold; and determining the table attribute information of each text region with respect to each table region as 0, in response to the ratio being less than or equal to the predetermined threshold.

According to an embodiment of the present disclosure, the attribute information comprises: text attribute information. The determining semantic information and attribute information of each of the at least one text region based on the visual information and the position information further comprises: recognizing the visual information of each text region by using a handwritten-text recognition model to determine the text attribute information of each text region, wherein the text attribute information is for indicating whether the text region contains handwritten text or not.

According to an embodiment of the present disclosure, the determining a global feature of the input image based on the visual information, the position information, the semantic information, and the attribute information comprises: for each of the at least one text region, converting the visual information, the position information, the semantic information, and the attribute information of each text region into a first feature, a second feature, a third feature, and a fourth feature respectively, and merging the first feature, the second feature, the third feature, and the fourth feature into a feature of each text region; determining an arrangement order for the at least one text region according to position information of each of the at least one text region; and encoding the features of the at least one text region successively by using a predetermined encoding model according to the arrangement order, to obtain the global feature of the input image.

According to an embodiment of the present disclosure, the merging the first feature, the second feature, the third feature, and the fourth feature into a feature of each text region comprises: performing a concatenate mergence on the first feature, the second feature, the third feature, and the fourth feature to obtain the feature of each text region; or performing a vector addition on the first feature, the second feature, the third feature, and the fourth feature to obtain the feature of each text region.

According to an embodiment of the present disclosure, the determining the question feature based on the input question comprises: encoding the input question successively by using a word embedding algorithm and a feature embedding algorithm to obtain the question feature.

According to an embodiment of the present disclosure, the generating a predicted answer for the input image and the input question based on the global feature and the question feature comprises: merging the global feature and the question feature to obtain a fusion feature; and processing the fusion feature by using a first prediction model to obtain a predicted answer for the fusion feature. The first prediction model is a model being trained based on a sample image, a sample question, and a first label, wherein the first label is for indicating a real answer for the sample image and the sample question.

According to an embodiment of the present disclosure, the generating a predicted answer for the input image and the input question based on the global feature and the question feature comprises: merging the global feature and the question feature to obtain a fusion feature; processing the fusion feature by using a second prediction model to obtain answer start position information for the fusion feature, wherein the second prediction model is a model being trained based on a sample image, a sample question, and a second label, wherein the second label is for indicating start position information of a real answer for the sample image and the sample question in the sample image; processing the fusion feature by using a third prediction model to obtain answer end position information for the fusion feature, wherein the third prediction model is a model being trained based on a sample image, a sample question, and a third label, wherein the third label is for indicating end position information of a real answer for the sample image and the sample question in the sample image; and determining the predicted answer for the input image and the input question based on the answer start position information, the answer end position information, and the input image.

According to an embodiment of the present disclosure, the generating a predicted answer for the input image and the input question comprises: generating M predicted answers for the input image and the input question, wherein M is an integer greater than 2, calculating edit distances between one of the M predicted answers and each of the other M−1 predicted answers except for the one predicted answer for each of the M predicted answers; summing the edit distances to obtain an evaluation for each predicted answer; and selecting a predicted answer having a highest evaluation from the M predicted answers as a preferred predicted answer.

Another aspect of the present disclosure provides an apparatus for visual question answering, comprising: an acquiring module, configured to acquire an input image and an input question; a detecting module, configured to detect visual information and position information of each of at least one text region in the input image; a determining module, configured to determine semantic information and attribute information of the at least one text region based on the visual information and the position information; an encoding module, configured to determine a global feature of the input image based on the visual information, the position information, the semantic information, and the attribute information; a question feature extracting module, configured to determine a question feature based on the input question; and a predicting module, configured to generate a predicted answer for the input image and the input question based on the global feature and the question feature.

According to an embodiment of the present disclosure, the detecting module is configured to detect the input image by using a text detection model to generate a bounding box for each of the at least one text region in the input image. Wherein, image information in the bounding box for each of the at least one text region is for indicating the visual information of each text region, and position information of the bounding box for each text region is for indicating the position information of each text region.

According to an embodiment of the present disclosure, the determining module comprises a first determining sub-module, configured to for each of the at least one text region, recognize the visual information of each text region by using a text recognition model to obtain the semantic information of each text region.

According to an embodiment of the present disclosure, the attribute information comprises: table attribute information. The determining module further comprises a second determining sub-module, configured to detect position information of at least one table region in the input image by using a table detection tool; and determine the table attribute information of each text region based on the position information of each text region and the position information of the at least one table region, wherein the table attribute information is for indicating whether each text region is located in the at least one table region or not.

According to an embodiment of the present disclosure, the second determining sub-module is specifically configured to calculate an intersection between each text region and each table region and a union between each text region and each table region according to the position information of each text region and the position information of each of the at least one table region; calculate a ratio between the intersection and the union; determine table attribute information of each text region with respect to each table region as 1, in response to the ratio being greater than a predetermined threshold; and determine the table attribute information of each text region with respect to each table region as 0, in response to the ratio being less than or equal to the predetermined threshold.

According to an embodiment of the present disclosure, the attribute information comprises: text attribute information. The determining module further comprises a third determining sub-module, configured to recognize the visual information of each text region by using a handwritten-text recognition model to determine the text attribute information of each text region, wherein the text attribute information is for indicating whether the text region contains handwritten text or not.

According to an embodiment of the present disclosure, the encoding module is configured to for each of the at least one text region, convert the visual information, the position information, the semantic information, and the attribute information of each text region into a first feature, a second feature, a third feature, and a fourth feature respectively, and merge the first feature, the second feature, the third feature, and the fourth feature into a feature of each text region; determine an arrangement order for the at least one text region according to position information of each of the at least one text region; and encode the features of the at least one text region successively by using a predetermined encoding model according to the arrangement order, to obtain the global feature of the input image.

According to an embodiment of the present disclosure, the encoding module merging the first feature, the second feature, the third feature, and the fourth feature into a feature of each text region comprises: the encoding module configured to perform a concatenate mergence on the first feature, the second feature, the third feature, and the fourth feature to obtain the feature of each text region; or perform a vector addition on the first feature, the second feature, the third feature, and the fourth feature to obtain the feature of each text region.

According to an embodiment of the present disclosure, the question feature extracting module is configured to encode the input question successively by using a word embedding algorithm and a feature embedding algorithm to obtain the question feature.

According to an embodiment of the present disclosure, the predicting module comprises a first predicting submodule, configured to merge the global feature and the question feature to obtain a fusion feature; and process the fusion feature by using a first prediction model to obtain a predicted answer for the fusion feature. The first prediction model is a model being trained based on a sample image, a sample question, and a first label, wherein the first label is for indicating a real answer for the sample image and the sample question.

According to an embodiment of the present disclosure, the predicting module comprises a second predicting submodule, configured to merge the global feature and the question feature to obtain a fusion feature; process the fusion feature by using a second prediction model to obtain answer start position information for the fusion feature, wherein the second prediction model is a model being trained based on a sample image, a sample question, and a second label, wherein the second label is for indicating start position information of a real answer for the sample image and the sample question in the sample image; process the fusion feature by using a third prediction model to obtain answer end position information for the fusion feature, wherein the third prediction model is a model being trained based on a sample image, a sample question, and a third label, wherein the third label is for indicating end position information of a real answer for the sample image and the sample question in the sample image; and determine the predicted answer for the input image and the input question based on the answer start position information, the answer end position information, and the input image.

According to an embodiment of the present disclosure, the apparatus further comprise a multi-answer fusing module, configured to generate M predicted answers for the input image and the input question, wherein M is an integer greater than 2, calculate edit distances between one of the M predicted answers and each of the other M−1 predicted answers except for the one predicted answer for each of the M predicted answers; sum the edit distances to obtain an evaluation for each predicted answer; and select a predicted answer having a highest evaluation from the M predicted answers as a preferred predicted answer.

Another aspect of the present disclosure provides a computer device, comprising: a memory, processor and computer instructions stored on the memory and executable on the processor; wherein the processor, when executing the computer instructions, realizes the above-mentioned method.

Another aspect of the present disclosure provides a non-transitory computer-readable storage medium having computer instructions stored thereon that, when executed by a processor, realizes the above-mentioned method.

Another aspect of the present disclosure provides a computer program including computer-executable instructions that, when executed, perform the above-mentioned method.

BRIEF DESCRIPTION OF THE ACCOMPANYING DRAWINGS

Figure 2:
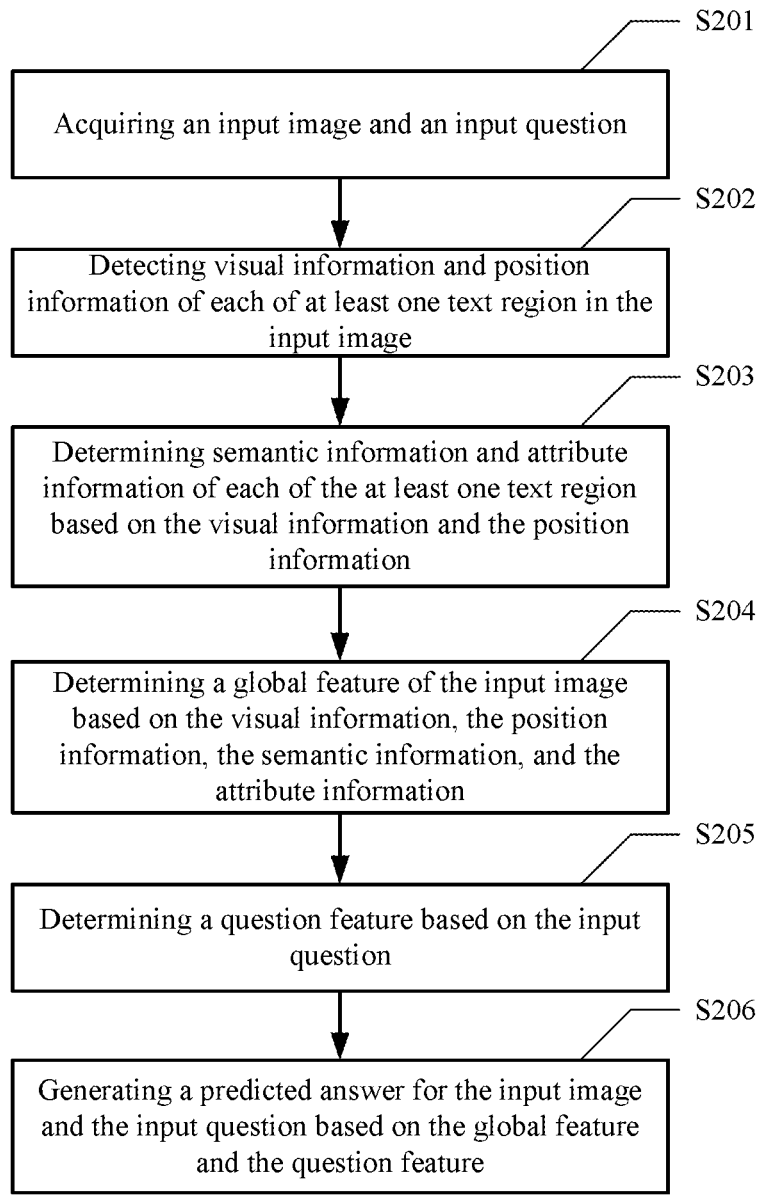
Figure 3A:
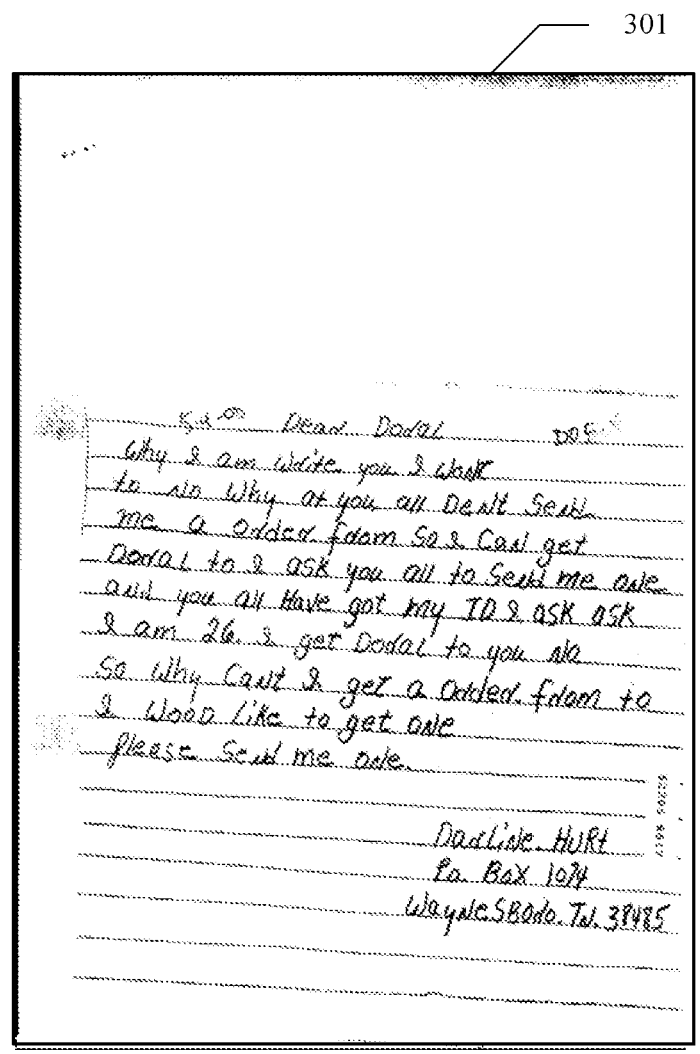
Figure 4A:
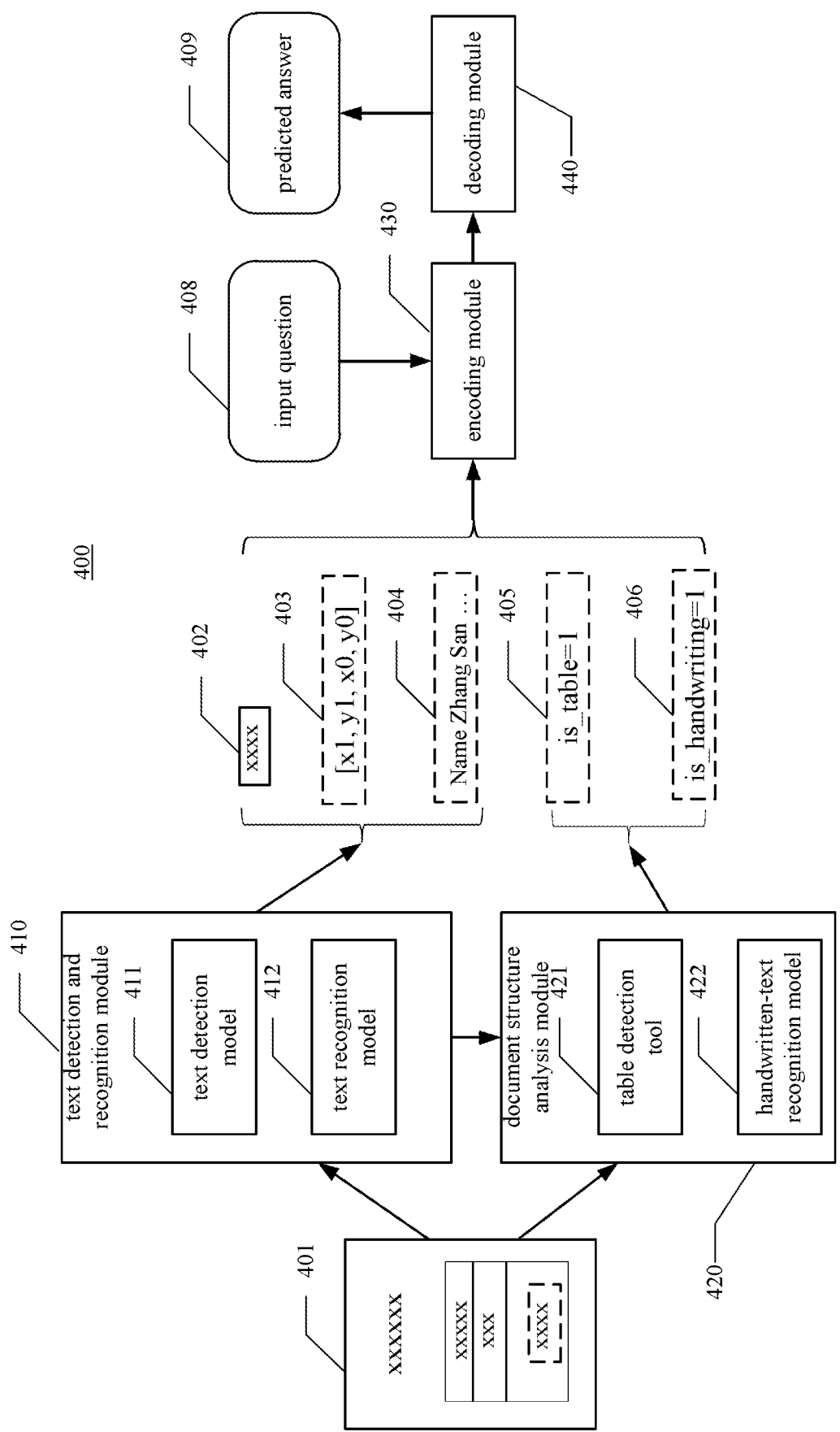
Figure 4B:
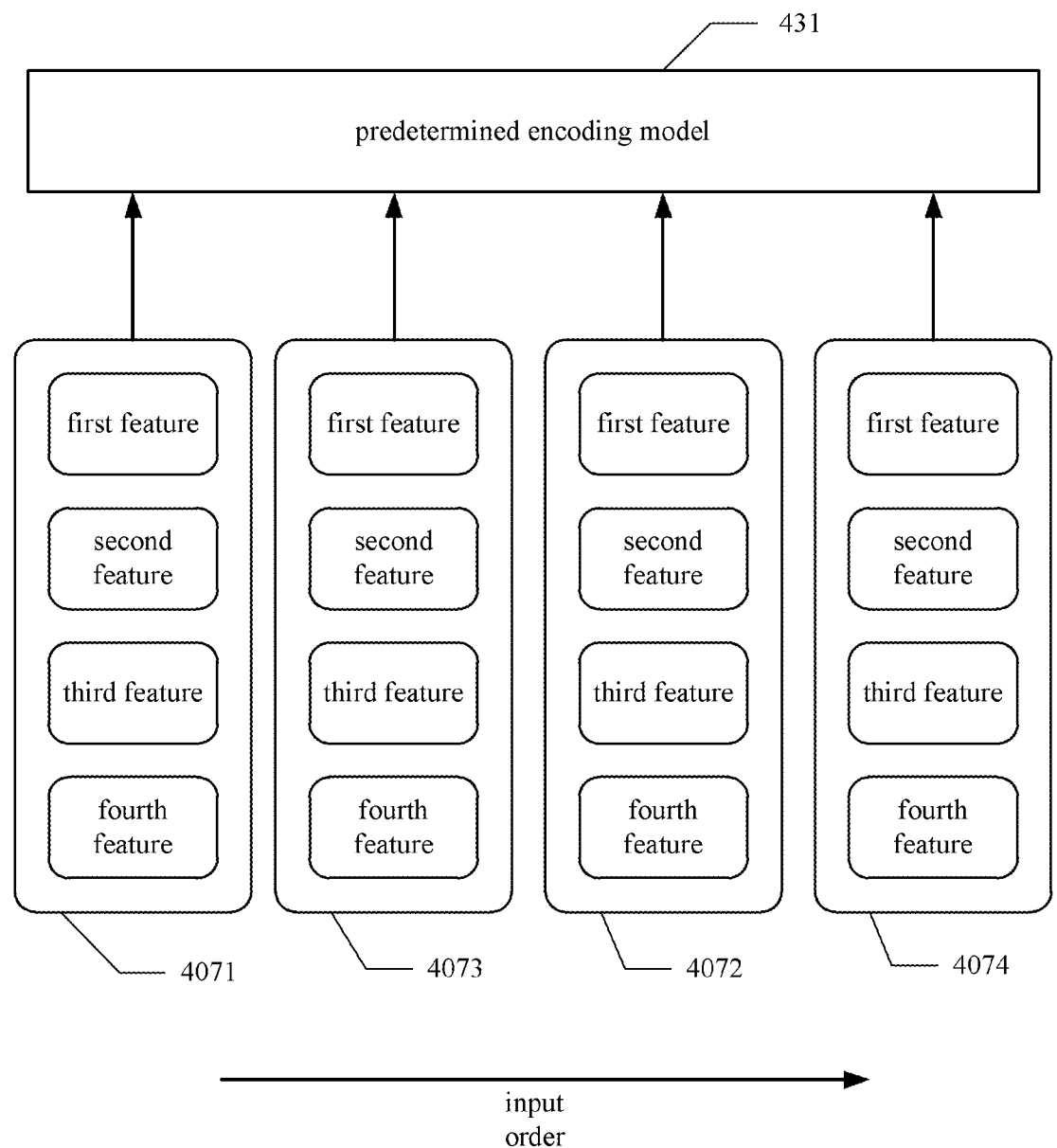
Figure 5A:
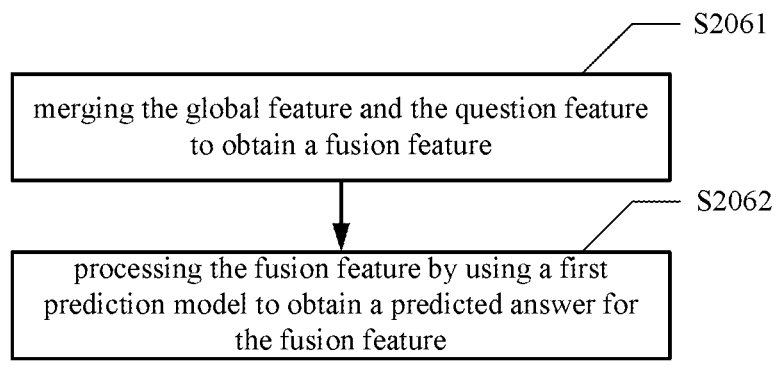
Figure 5B:
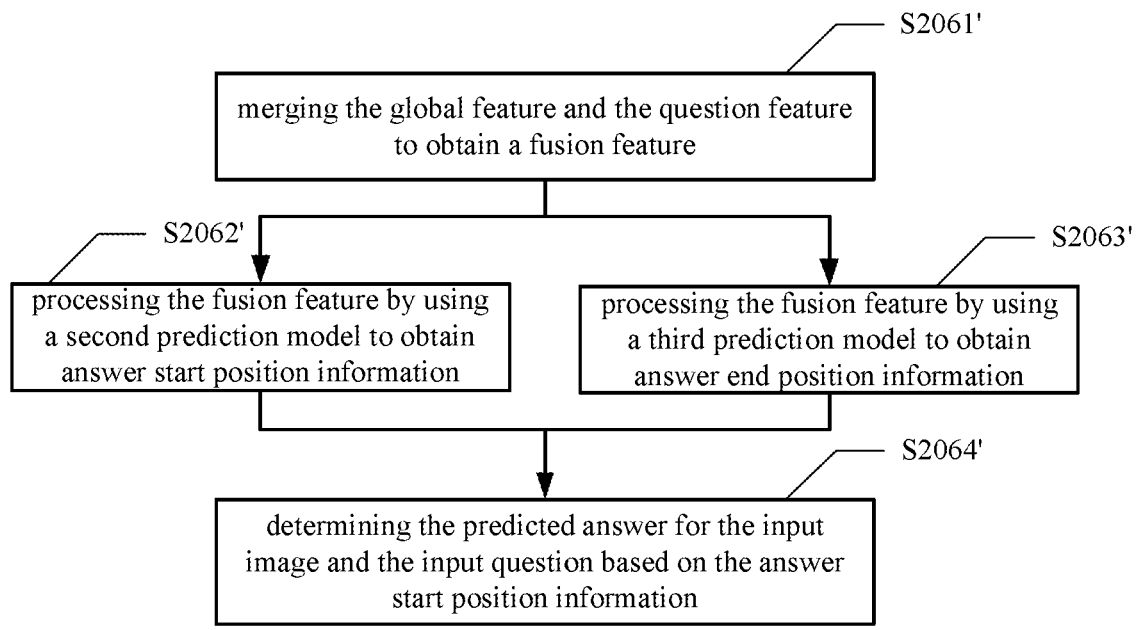
Figure 6:
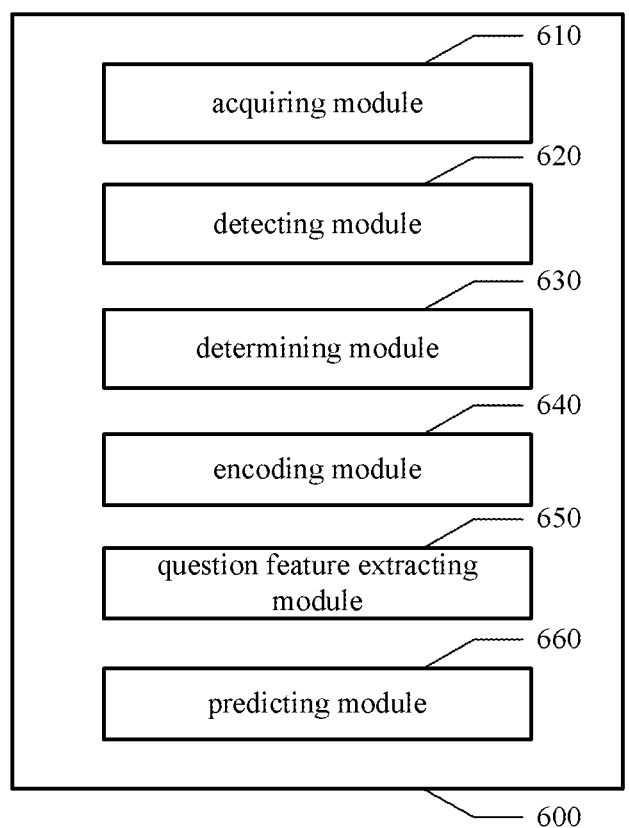
Figure 7:
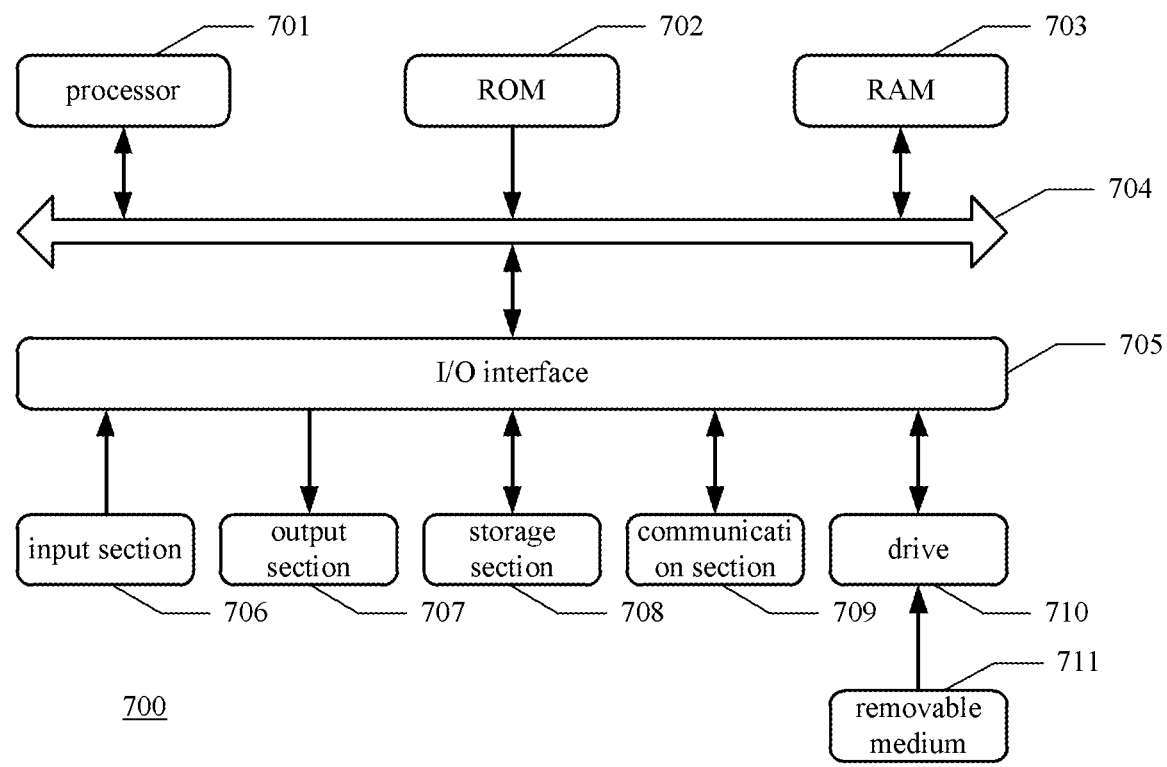

The above and other objects, features, and advantages of the present disclosure will be more apparent through the following description of embodiments of the present disclosure with reference to the accompanying drawings, in which:

FIG. 1 schematically shows an exemplary system architecture applying a method and an apparatus for visual question answering according to an embodiment of the present disclosure;

FIG. 2 schematically shows a flowchart of a method for visual question answering according to an embodiment of the present disclosure;

FIGS. 3A to 3B schematically show an exemplary diagram of an input image according to an embodiment of the present disclosure;

FIG. 4A schematically shows an exemplary diagram of a process of visual question answering according to an embodiment of the present disclosure;

FIG. 4B schematically shows an exemplary diagram of an encoding process according to an embodiment of the present disclosure;

FIGS. 5A to 5B schematically show a flowchart of a method for visual question answering according to another embodiment of the present disclosure;

FIG. 6 schematically shows a block diagram of an apparatus for visual question answering according to an embodiment of the present disclosure; and FIG. 7 schematically shows a block diagram of a computer device according to an embodiment of the present disclosure.

DETAILED DESCRIPTION

Hereinafter, embodiments of the present disclosure will be described with reference to the accompanying drawings. It should be understood, however, that these descriptions are merely exemplary and are not intended to limit the scope of the present disclosure. In the following detailed description, for ease of interpretation, many specific details are set forth to provide a comprehensive understanding of the embodiments of the present disclosure. However, it is clear that one or more embodiments may further be implemented without these specific details. In addition, in the following description, descriptions of well-known structures and technologies are omitted to avoid unnecessarily obscuring the concepts of the present disclosure.

The terms used herein are for the purpose of describing specific embodiments only and are not intended to limit the present disclosure. The terms "comprising", "including", etc. used herein indicate the presence of the feature, step, operation and/or part, but do not exclude the presence or addition of one or more other features, steps, operations or parts.

All terms used herein (including technical and scientific terms) have the meanings generally understood by those skilled in the art, unless otherwise defined. It should be noted that the terms used herein shall be interpreted to have meanings consistent with the context of this specification, and shall not be interpreted in an idealized or too rigid way.

In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C). In the case of using the expression similar to "at least one of A, B and C", it should be explained according to the meaning of the expression generally understood by those skilled in the art (for example, "a system having at least one of A, B and C" should include but not be limited to a system having only A, a system having only B, a system having only C, a system having A and B, a system having A and C, a system having B and C, and/or a system having A, B and C).

The embodiments of the present disclosure provide a method and an apparatus for visual question answering, a computer device and a medium. The method for visual question answering may include an acquiring process, a detecting process, a determining process, an encoding process, a question feature extracting process and a predicting process. In the acquiring process, an input image and an input question are acquired. In the detecting process, visual information and position information of each of at least one text region in the input image are detected. Then the determining process is performed, in which semantic information and attribute information of the at least one text region are determined based on the visual information and the position information. The encoding process is performed based on the visual information, the position information, the semantic information, and the attribute information, to determine a global feature of the input image. In the question feature extracting process, a question feature is determined based on the input question. The predicting process may be performed based on the global feature and the question feature, to generate a predicted answer for the input image and the input question.

Visual question answering is a challenging task, and a goal of visual question answering is to connect computer vision with natural language processing. In a visual question answering task, for example, given an image and a question related to the image, a machine is required to infer an answer for the question according to image content and some common sense. In order to complete the visual question answering task, the machine is ensured to have an ability of cross-modal understanding, to realize a comprehensive understanding of data under two different modalities of vision and language. Therefore, the visual question answering task has more requirements compared with other single modality tasks (such as image identification, document classification, etc.).

FIG. 1 schematically shows an exemplary system architecture 100 applying a method and an apparatus for visual question answering according to an embodiment of the present disclosure. It should be noted that FIG. 1 is only an example of a system architecture in which the embodiments of the present disclosure may be applied, so as to help those skilled in the art to understand the technical content of the present disclosure. It does not mean that the embodiments of the present disclosure cannot be used for other apparatuses, systems or scenes.

As shown in FIG. 1, a system architecture 100 of this embodiment may include a plurality of terminal devices 110, a network 120, and a server 130. Wherein, the terminal devices 110 may be various terminal devices, such as desktop, portable computer, smart phone, tablet computer, etc., and are not limited herein. The server 130 may be various electronic devices having certain computing ability, for example, the server 130 may be a server or a server cluster, and is not limited herein. The terminal devices 110 may be installed with software clients having various functions to interact with the server 130 by using a software client.

It may be understood that in an embodiment, the method for visual question answering according to the embodiment of the present disclosure may be performed by a terminal device 110, and accordingly, the apparatus for visual question answering may be provided in the terminal device 110. In another embodiment, the method for visual question answering according to the embodiment of the present disclosure may be performed by the server 130, and accordingly, the apparatus for visual question answering may be provided in the server 130. In another embodiment, the method for visual question answering according to the embodiment of the present disclosure may be performed by other devices capable of communicating with a terminal device 110 and/or the server 130, and accordingly, the apparatus for visual question answering may be provided in the other devices.

Nowadays, the system for visual question answering is widely studied in academic and industrial circles. A goal of this kind of system for visual question answering is to design a reasonable model, so that the system for visual question answering may answer accurately for any question described by natural language and any given image after full understanding and reasoning. However, there are still some difficulties to overcome in a current system for visual question answering. For example, in a scene of document visual question answering (DocVQA) based on document image, most schemes only rely on text semantic in an input image for modeling, without considering structural information of a document in the image. Therefore, only relatively simple document images may be dealt with, while for complex document images, such as document images containing tables, graphics, columns and other structures, processing effect is relatively poor, and accuracy of answer prediction is poor.

According to an embodiment of the present disclosure, a method for visual question answering is provided, which may be applied to a scene of DocVQA. This method is illustrated by exemplary drawings. It should be noted that a serial number for each operation in the following method is only used as representation of the operation for description, and should not be regarded as representing a performing order of each operation. Unless explicitly indicated, the method is not intended to be performed exactly in the shown order.

FIG. 2 schematically shows a flowchart of a method for visual question answering according to an embodiment of the present disclosure.

As shown in FIG. 2, the method may include operations S201 to S206.

In operation S201, an input image and an input question are acquired.

Exemplarily, the input image acquired in the operation S201 is a document image. For example, the input image may be a document image acquired by scanning, photographing and other operations for a document to be processed.

FIGS. 3A to 3B schematically show an exemplary diagram of an input image according to an embodiment of the present disclosure. In FIG. 3A and FIG. 3B, input images 301 in two examples are shown respectively. A text language in the document image may be set according to actual demands. For example, the text language may further be other languages, and is not limited here.

In operation S202, visual information and position information of each of at least one text region in the input image are detected.

Exemplarily, each text region in the input image may correspond to a region occupied by one or more lines of text in the input image. In response to there being a large gap in a same line of text, for example, a same line of text may locate in different cells of a table, a region occupied by text in each cell may further be set as a text region in the input image. A detecting range for the text region may be adjusted according to actual demands. In principle, each text region contains a plurality of text distributed compactly. In an example shown in FIG. 3B, a text region 302 in an input image is shown as an example. Image information in a dashed box may be used as the visual information of the text region 302, and a relative position of the dashed box to the input image may be used as the position information of the text region 302.

In operation S203, semantic information and attribute information of each of the at least one text region are determined based on the visual information and the position information.

Exemplarily, the semantic information of each text region may be for indicating a shallow semantic understanding and a deep semantic understanding for the text region. The attribute information of each text region may describe one or more attribute features of the text region in the input image from one or more dimensions. For example, the attribute information may include various structural attribute information of a document, such as paragraph information, table information, handwriting information, etc.

In operation S204, a global feature of the input image is determined based on the visual information, the position information, the semantic information, and the attribute information.

Exemplarily, the operation S204 comprehensively considers the visual information, position information, semantic information and attribute information of each text region in the input image in a process of feature encoding for the input image. Since the above kinds of information describe features of the text region in the input image from different angles, a receptive field is added to encode the input image, the global feature of the input image may be obtained.

In operation S205, a question feature is determined based on the input question.

In operation S206, a predicted answer for the input image and the input question is generated based on the global feature and the question feature.

Those skilled in the art may understand that according to the method for visual question answering of the embodiments of the present disclosure, after acquiring an input image and an input question, not only are visual information and position information of each text region in the input image detected, but further semantic information and attribute information of each text region are determined based on the visual information and the position information. A global feature of the input image may be obtained by encoding the input image based on the visual information, the position information, the semantic information, and the attribute information, to pay attention to and learn feature information of the input image more comprehensively. On this basis, a final answer may be predicted based on the global feature of the input image and a question feature of the input question. Due to the enrichment and optimization of the feature representation for the input image in an early stage, reasoning ability for an input image containing a complex document in a process of visual question answering is effectively enhanced, making the process of visual question answering according to the embodiments of the present disclosure more interpretable and suitable for a wider range of document analysis and processing scenes.

FIG. 4A schematically shows an exemplary diagram of a process of visual question answering according to an embodiment of the present disclosure.

As shown in FIG. 4A, a network model 400 may be constructed in advance, wherein the network model 400 may include a text detection and recognition module 410, a document structure analysis module 420, an encoding module 430, and a decoding module 440. According to an embodiment of the present disclosure, each module in the above network model 400 is intended to be trained so that the network model 400 has an ability to perform the task of visual question answering as shown in FIG. 2. In a training process, in an embodiment, the network model 400 may be trained as a whole, a sample image and a sample question may be input into the network model 400, and a parameter of the network model 400 may be optimized according to a difference between an output of the network model 400 and a sample label until an objective function of the network model 400 converges. Wherein, the sample label is a real answer for the sample image and the sample question. In another embodiment, each module in the network model 400 may be separately trained so that each module has a processing ability expected by an embodiment of the present disclosure. The method for visual question answering according to an embodiment of the present disclosure may be performed by using the trained network model 400. The following is an example of the performing process.

According to an embodiment of the present disclosure, as shown in FIG. 4A, the text detection and recognition module 410 may include a text detection model 411. The operation S202 of detecting visual information and position information of each of at least one text region in the input image may be performed in a following manner. The input image 401 is detected by using the text detection model 411. The text detection model 411 detects the text region in the input image 401 as a target object to generate a bounding box for each of the at least one text region in the input image 401. The dotted box as shown in FIG. 4A may be regarded as a bounding box for a text region. Wherein, image information 402 in the bounding box for each of the at least one text region (for example, a picture in the bounding box) is for indicating the visual information of the text region, and position information 403 of the bounding box for each text region (for example, a height value, width value and coordinate value of the center point of the bounding box) is for indicating the position information of the text region. The text detection model 411 used in the embodiment may be a directly acquired pre-trained text detection model, or may be obtained by constructing an object detection model (such as Fast RCNN (Faster Region Convolutional Neural Network), etc.) and training based on a sample document image and a predetermined label.

Further, in order to obtain the semantic information of each text region in the input image, according to an embodiment of the present disclosure, as shown in FIG. 4A, the text detection and recognition module 410 may further include a text recognition model 412. The operation S203 of determining semantic information of each of the at least one text region based on the visual information and the position information may be performed in a following manner. For each of the at least one text region, the visual information 402 of each text region is recognized by using a text recognition model 412 to obtain the semantic information 404 of each text region. For example, the semantic information of each text region may be represented as text content contained in the text region. The text recognition model 412 used in the embodiment may be a directly acquired pre-trained text recognition model, or may be obtained by constructing a recognition model and training based on a sample document image and a predetermined label. The text recognition model 412 may perform the above recognition process by using OCR (optical character recognition) technology.

Exemplarily, the text detection and recognition module 410 may be obtained by training based on an East (efficient and accurate scene text) detection architecture.

The text detection and recognition module 410 outputs the visual information and position information of each text region to the document structure analysis module 420, and one or more attribute information of the document contained in the input image is analyzed by the document structure analysis module 420.

In an embodiment of the present disclosure, the attribute information of each text region in the input image may include table attribute information, wherein the table attribute information is for indicating whether the text region is located in at least one table region or not. The operation S203 of determining attribute information of each of the at least one text region based on the visual information and the position information may be performed in a following manner. As shown in FIG. 4A, the document structure analysis module 420 includes a table detection tool 421, and position information of at least one table region in the input image 401 may be detected by using the table detection tool 421. A table detection model 411 detects the table region in the input image 401 as a target object to generate at least one table bounding box for each table region in the input image 401. Position information of a corresponding table region may be determined based on the position information of the table bounding box. Then, the document structure analysis module 420 determines the table attribute information 405 of each text region based on the position information of each text region and the position information of the at least one table region.

Exemplarily, for each detected text region A, whether the text region A is located in a detected table region T may be determined according to a position relationship between the text region A and the table region T, to determine table attribute information of the text region A to the table region T. For example, if the text region is in the table region, the table attribute information of the text region A to the table region T may be expressed as "is_table=1". In response to the text region not being in the table region, the table attribute information of the text region A to the table region T is expressed as "is_table=0".

For example, the position relationship between the text region A and the table region T may be determined by an intersection-over-union (IoU). The following manner may be performed. An intersection area between a bounding box for the text region A and a table bounding box for the table region T is calculated to be $X_1$, and a union area between the bounding box for the text region A and the table bounding box for the table region T is calculated to be $X_2$. If $X_1/X_2$ is greater than a first predetermined threshold, the text region A overlaps the table region T, i.e., the text region A is located in the table region T. If $X_1/X_2$ being less than or equal to the first predetermined threshold, the text region A is not located in the table region T.

For another example, the position relationship between the text region A and the table region T may be determined in a following manner. The intersection area between the bounding box for the text region A and the table bounding box for the table region T is calculated to be $X_1$, and an area of the bounding box for the text region A is calculated to be $X_3$. If $X_1/X_3$ is greater than a second predetermined threshold, the text region A overlaps the table region T, i.e., the text region A is located in the table region T. If $X_1/X_3$ is less than or equal to the second predetermined threshold, the text region A is not located in the table region T.

In an embodiment of the present disclosure, the attribute information of each text region in the input image may include: text attribute information, wherein the text attribute information is for indicating whether the text region contains handwritten text or not. The operation S203 of determining attribute information of each of the at least one text region based on the visual information and the position information may be performed in a following manner. As shown in FIG. 4A, the document structure analysis module 420 may further include a handwritten-text recognition model 422, the visual information of each text region recognize is recognized by using the handwritten-text recognition model 422 to determine the text attribute information 406 of each text region, and a classification result indicating whether the text contained in each text region is handwritten or not may be output. In this example, the handwritten-text recognition model 422 may be a pre-constructed binary classification model for classifying whether text is handwritten or not.

For example, for each detected text region A, if the handwritten-text recognition model 422 outputting a classification result 1 indicating text contained in the text region A is handwritten, the text attribute information of the text region A may be expressed as "is_handwriting=1". If the handwritten-text recognition model 422 outputting a classification result 0 indicating text contained in the text region A is not handwritten, the text attribute information of text region A may be expressed as "is_handwriting=0".

In the example shown in FIG. 4A, position information 403 of a text region (for example, text region marked by a dashed box in the input image 401) is expressed as "[x1, y1, x0, y0]", indicating a height x1 and a width y1 of the bounding box for the text region and coordinate values (x0, y0) of the center point. The semantic information 404 of the text region is expressed as: "Name Zhang San . . . ". The table attribute information 405 of the text region is expressed as "is_table=1". The text attribute information 406 of the text region is expressed as "is_handwriting=1".

According to an embodiment of the present disclosure, after acquiring the visual information, position information, semantic information and attribute information of each text region in the input image, for each of the at least one text region, visual embedding is performed on the visual information of the text region to obtain a first feature representing the visual information. Position embedding is performed on the position information of the text region to obtain a second feature representing the position information. Token embedding is performed on the semantic information of the text region to obtain a third feature representing the semantic information. Attribute embedding is performed on the attribute information of the text region to obtain a fourth feature representing the attribute information. The first feature, the second feature, the third feature and the fourth feature may all be expressed in vector forms. In response to the attribute information including table attribute information and text attribute information, the fourth feature may include two feature vectors.

For each text region in the input image, the first feature, the second feature, the third feature and the fourth feature of the text region may be merged into a feature of the text region. For example, concatenate mergence may be performed on the first feature, the second feature, the third feature and the fourth feature to obtain the feature of the text region. Alternatively, vector addition may be performed on the first feature, the second feature, the third feature and the fourth feature to obtain the feature of the text region.

With reference to FIG. 4A, features of each text region in the input image may be input into the encoding module 430 for an encoding process to obtain the global feature of the input image. For example, input manner of the feature of each text region may be as shown in FIG. 4B.

FIG. 4B schematically shows an exemplary diagram of an encoding process according to an embodiment of the present disclosure.

As shown in FIG. 4B, the encoding module 430 may include a predetermined encoding model 431, the predetermined encoding model 431 may be, for example, a long short term memory (LSTM) model, a graph convolutional network (GCN), a transformer decoder, etc. An arrangement order for the at least one text region may be determined according to position information of each of the at least one text region in the input image. For example, in response to the input image including four text regions, the arrangement order for the four text regions may be determined as $\{A_1, A_3, A_2, A_4\}$ according to an order from left to right and from top to bottom of each line of text in the input image combining with a reading order of a user. Taking this order as an input order, a feature 4071 of the text region $A_1$, a feature 4073 of the text region $A_3$, a feature 4072 of the text region $A_2$ and a feature 4074 of the text region $A_4$ are input into the predetermined encoding model 431 successively. The predetermined encoding model 431 is used to encode the features of the four text regions successively to obtain the global feature of the input image. Wherein, the feature of each text region is combined by the corresponding first feature, second feature, third feature and fourth feature.

With reference to FIG. 4A, on the one hand, the decoding module 440 acquires the global feature of the input image, on the other hand, the decoding module 440 acquires the question feature of the input question 408. In an embodiment of the present disclosure, a word embedding algorithm and a feature embedding algorithm may be used to encode the input question 408 successively to obtain the question feature q. In this example, a Glove word embedding algorithm and a Bi-GRU feature embedding algorithm are used to obtain a feature representation of the whole question q. The decoding module 440 generates a predicted answer 409 for the input image and the input question based on the global feature and the question feature. The process of generating a predicted answer may be described with reference to FIGS. 5A and 5B.

FIG. 5A schematically shows a flowchart of a method for visual question answering according to another embodiment of the present disclosure, exemplarily describing an embodiment of the operation S206 of generating a predicted answer for the input image and the input question based on the global feature and the question feature.

As shown in FIG. 5A, the method may include operations S2061 to S2062.

In operation S2061, the global feature and the question feature are merged to obtain a fusion feature.

Exemplarily, in the operation S2061, the global feature and the question feature may be merged by using a concatenate mergence or a vector addition mergence.

In operation S2062, the fusion feature is processed by using a first prediction model to obtain a predicted answer for the fusion feature.

Exemplarily, the first prediction model is a model being trained based on a sample image, a sample question and a first label, wherein the first label is for indicating a real answer for the sample image and the sample question.

It may be understood that the process of answer prediction shown in FIG. 5A may be referred to as a manner of generating an answer. In this manner, the obtained global feature vector and the obtained question feature vector may be input into a trained recurrent neural network (RNN), and a corresponding answer may be output by the RNN. The RNN is equivalent to a multi-classifier for multiple predetermined answer categories. The answer generated by this scheme is flexible, and the predicted answer may be text not included in the input image.

FIG. 5B schematically shows a flowchart of a method for visual question answering according to another embodiment of the present disclosure, exemplarily describing another embodiment of the operation S206 of generating a predicted answer for the input image and the input question based on the global feature and the question feature.

As shown in FIG. 5B, the method may include operations S2061' to S2064'.

In operation S2061', the global feature and the question feature are merged to obtain a fusion feature. Process of the operation is same as that of S2061, and will not be repeated here.

In operation S2062', the fusion feature is processed by using a second prediction model to obtain answer start position information for the fusion feature.

Exemplarily, the second prediction model is a model being trained based on a sample image, a sample question, and a second label, wherein the second label is for indicating start position information of a real answer to the sample image and the sample question in the sample image.

In operation S2063', the fusion feature is processed by using a third prediction model to obtain answer end position information for the fusion feature.

Exemplarily, the third prediction model is a model being trained based on a sample image, a sample question, and a third label, wherein the third label is for indicating end position information of a real answer for the sample image and the sample question in the sample image.

In operation S2064', the predicted answer for the input image and the input question is determined based on the answer start position information, the answer end position information, and the input image.

Exemplarily, the operation S2064' sets text content between the answer start position and the answer end position in the input image as the predicted answer.

It may be understood that generally, due to an association relationship between an input image and an input question, a predicted answer for the input question is often text content in the input image. Based on this feature, the process of answer prediction shown in FIG. 5B may be referred to as a manner of predicting a position of an answer in an input image. The second prediction model and the third prediction model may be trained, the second prediction model is used to determine whether each word contained in the input image corresponds to the start position of the answer or not, and the third prediction model is used to determine whether each word contained in the input image corresponds to the end position of the answer or not. Both models may be classification models. The obtained encoded global feature and the obtained question feature vector are input into the second prediction model, and the second prediction model outputs start position information of the answer. The obtained encoded global feature and the obtained question feature vector are input into the third prediction model, and the third prediction model outputs the end position information of the answer. The text content between the answer start position and the answer end position in the input image is used as the answer.

Furthermore, based on the above embodiments, for the models used above, if structures or parameters of one or more models change, or training samples change, a different system for visual question answering may be obtained. Different systems for visual question answering may output different predicted answers for a same image and a same question. In this case, the method for visual question answering according to an embodiment of the present disclosure may further include: generating M predicted answers for the input image and the input question, wherein M is an integer greater than 2, calculating edit distances between one of the M predicted answers and each of the other M−1 predicted answers except for the one predicted answer for each of the M predicted answers; summing the edit distances to obtain an evaluation for each predicted answer; and selecting a predicted answer having a highest evaluation from the M predicted answers as a preferred predicted answer.

FIG. 6 schematically shows a block diagram of an apparatus for visual question answering according to an embodiment of the present disclosure.

As shown in FIG. 6, the apparatus for visual question answering 600 may include an acquiring module 610, a detecting module 620, a determining module 630, an encoding module 640, a question feature extracting module 650, and a predicting module 660.

The acquiring module 610 is used to acquire an input image and an input question.

The detecting module 620 is used to detect visual information and position information of each of at least one text region in the input image.

The determining module 630 is used to determine semantic information and attribute information of the at least one text region based on the visual information and the position information.

The encoding module 640 is used to determine a global feature of the input image based on the visual information, the position information, the semantic information, and the attribute information.

The question feature extraction module 650 is used to determine a question feature based on the input question.

The prediction module 660 is used to generate a predicted answer for the input image and the input question based on the global feature and the question feature.

It should be noted that the implementation mode, solved technical questions, realized functions and achieved technical effects of each module/unit/sub-unit in the embodiment of the device part are respectively the same as or similar to the implementation mode, solved technical questions, realized functions and achieved technical effects of each corresponding step in the embodiment of the method part, and will not be repeated here.

Any multiple of the modules, sub modules, units and sub units according to the embodiments of the present disclosure, or at least part of the functions of any number of them may be implemented in one module. Any one or more of the modules, sub modules, units and sub units according to the embodiments of the present disclosure may be split into multiple modules for implementation. Any one or more of the modules, sub modules, units and sub units according to the embodiments of the present disclosure may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, one or more of the modules, sub modules, units and sub units according to the embodiments of the present disclosure may be at least partially implemented as a computer program module that, when executed, performs the corresponding functions.

For example, any multiple of the acquiring module 610, the detecting module 620, the determining module 630, the encoding module 640, the question feature extracting module 650, and the predicting module 660 may be integrated into one module for implementation, or any one of them may be split into multiple modules. Alternatively, at least part of the functions of one or more of these modules may be combined with at least part of the functions of other modules and implemented in one module. According to the embodiments of the present disclosure, at least one of the acquiring module 610, the detecting module 620, the determining module 630, the encoding module 640, the question feature extracting module 650, and the predicting module 660 may be may be implemented at least partially as a hardware circuit, such as a field programmable gate array (FPGA), a programmable logic array (PLA), a system on a chip, a system on a substrate, a system on a package, an Application Specific Integrated Circuit (ASIC), or may be implemented by hardware or firmware in any other reasonable way that integrates or encapsulates the circuit, or may be implemented by any one of the three implementation modes of software, hardware and firmware or an appropriate combination thereof. Alternatively, at least one of the acquiring module 610, the detecting module 620, the determining module 630, the encoding module 640, the question feature extracting module 650, and the predicting module 660 may be at least partially implemented as a computer program module that, when executed, performs the corresponding functions.

FIG. 7 schematically shows a block diagram of a computer device adapted to implement the method described above according to an embodiment of the present disclosure. The computer device shown in FIG. 7 is only an example and should not bring any limitation to the function and scope of use of the embodiments of the present disclosure.

As shown in FIG. 7, a computer device 700 according to the embodiment of the present disclosure includes a processor 701, which may execute various appropriate actions and processing according to the program stored in a read only memory (ROM) 702 or the program loaded into a random access memory (RAM) 703 from a storage section 708. The processor 701 may, for example, include a general-purpose microprocessor (for example, CPU), an instruction set processor and/or a related chipset and/or a special-purpose microprocessor (for example, an application specific integrated circuit (ASIC)), and the like. The processor 701 may also include an on-board memory for caching purposes. The processor 701 may include a single processing unit or multiple processing units for executing different actions of the method flow according to the embodiments of the present disclosure.

Various programs and data required for the operation of the device 700 are stored in the RAM 703. The processor 701, the ROM 702 and the RAM 703 are connected to each other through a bus 704. The processor 701 executes various operations of the method flow according to the embodiments of the present disclosure by executing the programs in the ROM 702 and/or the RAM 703. It should be noted that the program may also be stored in one or more memories other than the ROM 702 and the RAM 703. The processor 701 may also execute various operations of the method flow according to the embodiments of the present disclosure by executing the programs stored in the one or more memories.

According to the embodiment of the present disclosure, the device 700 may further include an input/output (I/O) interface 705 which is also connected to the bus 704. The device 700 may further include one or more of the following components connected to the I/O interface 705: an input section 706 including a keyboard, a mouse, etc.; an output section 707 including a cathode ray tube (CRT), a liquid crystal display (LCD), etc. and a speaker, etc.; a storage section 708 including a hard disk, etc.; and a communication section 709 including a network interface card such as a LAN card, a modem, and the like. The communication section 709 performs communication processing via a network such as the Internet. A drive 710 is also connected to the I/O interface 705 as required. A removable medium 711, such as a magnetic disk, an optical disk, a magneto-optical disk, a semiconductor memory, and the like, is installed on the drive 710 as required, so that the computer program read therefrom is installed into the storage section 708 as needed.

The method flow according to the embodiments of the present disclosure may be implemented as a computer software program. For example, the embodiments of the present disclosure include a computer program product including a computer program carried on a computer-readable storage medium. The computer program includes a program code for execution of the method shown in the flowchart. In such an embodiment, the computer program may be downloaded and installed from the network through the communication section 709, and/or installed from the removable medium 711. When the computer program is executed by the processor 701, the above-mentioned functions defined in the system of the embodiment of the present disclosure are performed. According to the embodiments of the present disclosure, the above-described systems, apparatuses, devices, modules, units, etc. may be implemented by computer program modules.

The present disclosure also provides a non-transitory computer-readable storage medium, which may be included in the apparatus/device/system described in the above embodiments; or exist alone without being assembled into the apparatus/device/system. The above-mentioned computer-readable storage medium carries one or more programs that when executed, perform the method according to the embodiments of the present disclosure.

According to the embodiments of the present disclosure, the non-transitory computer-readable storage medium may be a non-volatile computer-readable storage medium, for example, may include but not limited to: portable computer disk, hard disk, random access memory (RAM), read-only memory (ROM), erasable programmable read-only memory (EPROM or flash memory), portable compact disk read-only memory (CD-ROM), optical storage device, magnetic storage device, or any suitable combination of the above. In the present disclosure, the computer-readable storage medium may be any tangible medium that includes or stores programs that may be used by or in combination with an instruction execution system, apparatus, or device. For example, according to the embodiments of the present disclosure, the computer-readable storage medium may include the above-mentioned ROM 702 and/or RAM 703 and/or one or more memories other than the ROM 702 and RAM 703.

The flowcharts and block diagrams in the drawings illustrate the possible architecture, functions, and operations of the system, method, and computer program product according to various embodiments of the present disclosure. In this regard, each block in the flowcharts or block diagrams may represent a part of a module, program segment, or code, which part includes one or more executable instructions for implementing the specified logical function. It should also be noted that, in some alternative implementations, the functions noted in the blocks may also occur in a different order than that noted in the accompanying drawings. For example, two blocks shown in succession may actually be executed substantially in parallel, or they may sometimes be executed in the reverse order, depending on the functions involved. It should also be noted that each block in the block diagrams or flowcharts, and the combination of blocks in the block diagrams or flowcharts, may be implemented by a dedicated hardware-based system that performs the specified functions or operations, or may be implemented by a combination of dedicated hardware and computer instructions.

Those skilled in the art may understand that the various embodiments of the present disclosure and/or the features described in the claims may be combined in various ways, even if such combinations are not explicitly described in the present disclosure. In particular, without departing from the spirit and teachings of the present disclosure, the various embodiments of the present disclosure and/or the features described in the claims may be combined in various ways. All these combinations fall within the scope of the present disclosure.

The embodiments of the present disclosure have been described above. However, these embodiments are for illustrative purposes only, and are not intended to limit the scope of the present disclosure. Although the embodiments have been described separately above, this does not mean that measures in the respective embodiments cannot be used in combination advantageously. The scope of the present disclosure is defined by the appended claims and their equivalents. Without departing from the scope of the present disclosure, those skilled in the art may make various substitutions and modifications, and these substitutions and modifications should all fall within the scope of the present disclosure.

We claim:

1. A method for visual question answering, comprising:
acquiring an input image and an input question;
detecting visual information and position information of each of at least one text region in the input image;
determining semantic information and attribute information of each of the at least one text region based on the visual information and the position information;
determining a global feature of the input image based on the visual information, the position information, the semantic information, and the attribute information;
determining a question feature based on the input question; and generating a predicted answer for the input image and the input question based on the global feature and the question feature,
wherein the generating a predicted answer for the input image and the input question comprises:
generating M predicted answers for the input image and the input question, wherein M is an integer greater than 2,
calculating edit distances between one of the M predicted answers and each of the other M−1 predicted answers except for the one predicted answer for each of the M predicted answers;
summing the edit distances to obtain an evaluation for each predicted answer; and selecting a predicted answer having a highest evaluation from the M predicted answers as a preferred predicted answer.

2. The method of claim 1, wherein the detecting visual information and position information of each of at least one text region in the input image comprises:
detecting the input image by using a text detection model to generate a bounding box for each of the at least one text region in the input image,
wherein, image information in the bounding box for each of the at least one text region is for indicating the visual information of each text region, and position information of the bounding box for each text region is for indicating the position information of each text region.

3. The method of claim 1, wherein the determining semantic information and attribute information of each of the at least one text region based on the visual information and the position information comprises:
for each of the at least one text region, recognizing the visual information of each text region by using a text recognition model to obtain the semantic information of each text region.

4. The method of claim 3, wherein the attribute information comprises: table attribute information; and
wherein, the determining semantic information and attribute information of each of the at least one text region based on the visual information and the position information further comprises:
detecting position information of at least one table region in the input image by using a table detection tool; and
determining the table attribute information of each text region based on the position information of each text region and the position information of the at least one table region, wherein the table attribute information is for indicating whether each text region is located in the at least one table region or not.

5. The method of claim 4, wherein the determining the table attribute information of each text region based on the position information of each text region and the position information of the at least one table region comprises:
calculating an intersection between each text region and each table region and a union between each text region and each table region according to the position information of each text region and the position information of each of the at least one table region;
calculating a ratio between the intersection and the union;
determining table attribute information of each text region with respect to each table region as 1, in response to the ratio being greater than a predetermined threshold; and
determining the table attribute information of each text region with respect to each table region as 0, in response to the ratio being less than or equal to the predetermined threshold.

6. The method of claim 3, wherein the attribute information comprises: text attribute information; and
wherein the determining semantic information and attribute information of each of the at least one text region based on the visual information and the position information further comprises: recognizing the visual information of each text region by using a handwritten-text recognition model to determine the text attribute information of each text region, wherein the text attribute information is for indicating whether the text region contains handwritten text or not.

7. The method of claim 1, wherein the determining a global feature of the input image based on the visual information, the position information, the semantic information, and the attribute information comprises:
for each of the at least one text region, converting the visual information, the position information, the semantic information, and the attribute information of each text region into a first feature, a second feature, a third feature, and a fourth feature respectively, and merging the first feature, the second feature, the third feature, and the fourth feature into a feature of each text region;
determining an arrangement order for the at least one text region according to position information of each of the at least one text region; and
encoding the features of the at least one text region successively by using a predetermined encoding model according to the arrangement order, to obtain the global feature of the input image.

8. The method of claim 7, wherein the merging the first feature, the second feature, the third feature, and the fourth feature into a feature of each text region comprises:
performing a concatenate mergence on the first feature, the second feature, the third feature, and the fourth feature to obtain the feature of each text region; or
performing a vector addition on the first feature, the second feature, the third feature, and the fourth feature to obtain the feature of each text region.

9. The method of claim 1, wherein the determining the question feature based on the input question comprises:
encoding the input question successively by using a word embedding algorithm and a feature embedding algorithm to obtain the question feature.

10. The method of claim 1, wherein the generating a predicted answer for the input image and the input question based on the global feature and the question feature comprises:
merging the global feature and the question feature to obtain a fusion feature; and
processing the fusion feature by using a first prediction model to obtain a predicted answer for the fusion feature, wherein the first prediction model is a model being trained based on a sample image, a sample question, and a first label, wherein the first label is for indicating a real answer for the sample image and the sample question.

11. The method of claim 1, wherein the generating a predicted answer for the input image and the input question based on the global feature and the question feature comprises:
merging the global feature and the question feature to obtain a fusion feature;
processing the fusion feature by using a second prediction model to obtain answer start position information for the fusion feature, wherein the second prediction model is a model being trained based on a sample image, a sample question, and a second label, wherein the second label is for indicating start position information of a real answer for the sample image and the sample question in the sample image;

processing the fusion feature by using a third prediction model to obtain answer end position information for the fusion feature, wherein the third prediction model is a model being trained based on a sample image, a sample question, and a third label, wherein the third label is for indicating end position information of a real answer for the sample image and the sample question in the sample image; and determining the predicted answer for the input image and the input question based on the answer start position information, the answer end position information, and the input image.

12. A computer device, comprising:

a memory having computer instructions stored thereon; and at least one processor;

wherein the processor, when executing the computer instructions, causes the at least one processor to perform the method of claim 1.

13. A non-transitory computer-readable storage medium having computer instructions stored thereon that, when executed by a processor, causes the at least one processor to perform the method of claim 1.

\* \* \* \* \*